(12) United States Patent
de la Torre Vega et al.

(10) Patent No.: US 7,643,320 B2
(45) Date of Patent: Jan. 5, 2010

(54) ISOLATED RESISTIVE SIGNATURE DETECTION FOR POWERED DEVICES

(75) Inventors: Luis de la Torre Vega, Madrid (ES); Fadi Saibi, Mountain View, CA (US)

(73) Assignee: Agere Systems Inc., Allentown, PA (US)

( * ) Notice: Subject to any disclaimer, the term of this patent is extended or adjusted under 35 U.S.C. 154(b) by 310 days.

(21) Appl. No.: 11/692,485

(22) Filed: Mar. 28, 2007

(65) Prior Publication Data

US 2008/0238656 A1    Oct. 2, 2008

(51) Int. Cl.
*H02M 3/335*    (2006.01)
*H02M 7/44*    (2006.01)

(52) U.S. Cl. .............................. 363/80; 363/92; 363/93; 363/97

(58) Field of Classification Search .............. 363/21.12, 363/21.13, 21.15, 21.16, 21.17, 21.18, 20, 363/74, 77, 80, 92, 93, 21.04, 21.05, 21.07–21.1, 363/95, 97; 327/39, 47; 710/11, 14, 38; 370/356, 437
See application file for complete search history.

(56) References Cited

U.S. PATENT DOCUMENTS

| | | | |
|---|---|---|---|
| 4,004,104 A | 1/1977 | Picandet et al. | 179/70 |
| 4,761,702 A | 8/1988 | Pinard | 361/18 |
| 5,138,543 A | 8/1992 | Harm et al. | 363/21.08 |
| 5,305,192 A | 4/1994 | Bonte et al. | 363/21.16 |
| 5,402,329 A | 3/1995 | Wittenbreder | 363/16 |
| 5,461,303 A | 10/1995 | Leman et al. | 323/222 |

(Continued)

FOREIGN PATENT DOCUMENTS

DE    103 32 841 A1    2/2005

(Continued)

OTHER PUBLICATIONS

L. Balogh, "A Practical Introduction to Digital Power Supply Control", Texas Instruments Incorporated, 2005, pp. 6-1 through 6-29. Downloaded from http://focus.ti.com/lit/ml/slup232.pdf, Apr. 5, 2006.

(Continued)

*Primary Examiner*—Jessica Han
*Assistant Examiner*—Emily Pham
(74) *Attorney, Agent, or Firm*—Mendelsohn, Drucker, & Associates, P.C.; Edward J. Meisarosh; Steve Mendelsohn (57) ABSTRACT

In one embodiment, a load connected to power sourcing equipment (PSE) compatible with a Power over Ethernet (PoE) standard is characterized to determine whether the load corresponds to a valid powered device (PD). A switching signal having a first frequency is generated on the isolated side and used to generate an electrical current through the isolated-side primary coil of a power transformer in the PSE. A first voltage measurement, corresponding to a first line-side voltage across the transformer's secondary coil, is generated on the isolated side, e.g., using an isolated-side auxiliary transformer coil. The load is characterized based on the first voltage measurement and the first frequency. To compensate for voltage offset, a second voltage measurement can be generated corresponding to a second frequency of the switching signal, where the load is then characterized based on the first and second voltage measurements and frequencies.

25 Claims, 7 Drawing Sheets

U.S. PATENT DOCUMENTS

| | | | | |
|---|---|---|---|---|
| 5,757,625 | A | 5/1998 | Schoofs | 363/21.13 |
| 5,991,172 | A | 11/1999 | Jovanovic et al. | 363/21.14 |
| 6,343,026 | B1 | 1/2002 | Perry | 363/65 |
| 6,640,308 | B1 | 10/2003 | Keyghobad et al. | 713/300 |
| 6,650,070 | B1 | 11/2003 | Hudson et al. | 315/312 |
| 6,958,920 | B2 | 10/2005 | Mednik et al. | 363/19 |
| 6,967,472 | B2 | 11/2005 | Balakrishnan et al. | |
| 6,972,969 | B1 | 12/2005 | Shteynberg et al. | |
| 6,995,991 | B1 | 2/2006 | Yang et al. | |
| 7,054,170 | B2 | 5/2006 | Yang et al. | 363/21.18 |
| 7,057,907 | B2 | 6/2006 | Oh | 363/21.05 |
| 7,061,780 | B2 | 6/2006 | Yang et al. | 363/21.16 |
| 7,142,437 | B2 | 11/2006 | Park | 363/18 |
| 7,196,503 | B2 | 3/2007 | Wood et al. | 323/276 |
| 7,259,972 | B2 | 8/2007 | Yang | 363/21.16 |
| 7,280,376 | B2 | 10/2007 | McDonald et al. | 363/20 |
| 7,362,593 | B2 | 4/2008 | Yang et al. | 363/21.16 |
| 7,471,522 | B2 | 12/2008 | Ng et al. | 363/21.12 |
| 7,471,531 | B2 | 12/2008 | Blaha et al. | 363/97 |
| 7,486,528 | B2 | 2/2009 | Yang | 363/21.12 |
| 2003/0080723 | A1 | 5/2003 | Chen et al. | 324/76.29 |
| 2005/0169017 | A1 | 8/2005 | Muegge et al. | |
| 2005/0285587 | A1 | 12/2005 | Yang et al. | |
| 2006/0002155 | A1 | 1/2006 | Shteynberg et al. | |
| 2006/0034102 | A1 | 2/2006 | Yang et al. | 363/21.13 |
| 2006/0056204 | A1 | 3/2006 | Yang et al. | |
| 2007/0019445 | A1* | 1/2007 | Blaha et al. | 363/21.12 |
| 2007/0024213 | A1 | 2/2007 | Shteynberg et al. | 315/291 |
| 2007/0070664 | A1 | 3/2007 | Chen | 363/95 |
| 2008/0049459 | A1 | 2/2008 | Blaha et al. | 363/21.16 |
| 2008/0071260 | A1 | 3/2008 | Shores | 606/34 |
| 2008/0192514 | A1 | 8/2008 | Zhou et al. | 363/21.12 |
| 2008/0238447 | A1* | 10/2008 | de la Torre Vega et al. | 324/676 |

FOREIGN PATENT DOCUMENTS

JP    2001203085    7/2001

OTHER PUBLICATIONS

L. Dixon, "Control Loop Cookbook", Texas Instruments Incorporated, 2002, 41 pages. Downloaded from: http://focus.ti.com/lit/ml/slup113a/slup113a.pdf, Apr. 5, 2006.

K. Kittipeerachon, et al., "Feedback Compensation Design for Switched Mode Power Supplies with a Right-Half-Plane (RHP) Zero", Power Electronics, Machines and Drives, 2004, (PEMD 2004). Second International Conference on (Conf. Publ. No. 498), pp. 236-241.

Y-F. Liu, et al., "Digital Control of Switching Power Converters", Proc. of IEEE Conference on Control Applications, Toronto, Canada, Aug. 28-31, 2005, pp. 635-640.

A. Peterchev, et al., "Quantization Resolution and Limit Cycling in Digitally Controlled PWM Converters", IEEE Trans. on Power Electronics, vol. 18, No. 1, Jan. 2003, pp. 301-308.

"Introduction to Power Supplies", National Semiconductor Application Note 556, Sep. 2002, pp. 1-7. Downloaded from: http://www.efficientpowersupplies.org/pages/intro_to_power_supplies.pdf, Apr. 5, 2006.

LT1737 Data Sheet, Linear Technology Corporation, Jun. 6, 2005, pp. 1-28.

* cited by examiner

ISOLATED RESISTIVE SIGNATURE DETECTION FOR POWERED DEVICES

CROSS-REFERENCE TO RELATED APPLICATIONS

This application contains subject matter related to the subject matter of the following U.S. patent applications: (i) Ser. No. 11/369,057, filed on Mar. 6, 2006, (ii) Ser. No. 11/536,770, filed on Sep. 29, 2006, and (iii) Ser. No. 11/691,112, filed on Mar. 26, 2007, which are incorporated herein by reference in their entirety.

BACKGROUND OF THE INVENTION

1. Field of the Invention

The current invention relates to communication networks capable of transmitting electrical power along with data, and more particularly, to systems and methods for the transmission of electrical power in Power-over-Ethernet (PoE) systems.

2. Description of the Related Art

A Power-over-Ethernet system is an Ethernet network capable of transmitting both data and electrical power over twisted wire pair cables, such as category 5 cables. Ethernet communication is currently defined by the IEEE 802.3 standard, and PoE is currently defined by the IEEE 802.3af standard, both of which are incorporated herein by reference. Using PoE allows for the convenient delivery of electrical power to Ethernet client devices, such as Internet telephones or cameras, which may otherwise require more cumbersome powering arrangements in order to operate. PoE allows for the delivery of electrical power using the same cables that transmit Ethernet data.

SUMMARY OF THE INVENTION

In one embodiment, the invention can be a method for characterizing a load connected to power sourcing equipment (PSE) having a power transformer having (i) an isolated side with a primary coil and (ii) a line side with a secondary coil connected to the load. The method comprises: (a) generating, on the isolated side, a switching signal having a first frequency and used to generate an electrical current through the primary coil, (b) generating, on the isolated side, a first voltage measurement corresponding to a first line-side voltage across the secondary coil resulting from the electrical current provided to the primary coil, and (c) characterizing the load based on the first voltage measurement and the first frequency.

In another embodiment, the invention can be a Power sourcing equipment (PSE) having a line side and an isolated side. The PSE comprises (a) a power transformer having (i) a primary coil on the isolated side and (ii) a secondary coil on the line side and connected to a load, and (b) power supply circuitry on the isolated side. The power supply circuitry is adapted to (a) generate and apply a switching signal having a first frequency, to generate an electrical current through the primary coil, (b) generate, on the isolated side, a first voltage measurement corresponding to a first line-side voltage across the secondary coil resulting from the electrical current provided to the primary coil, and (c) characterize the load based on the first voltage measurement and the first frequency.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Figure 1:
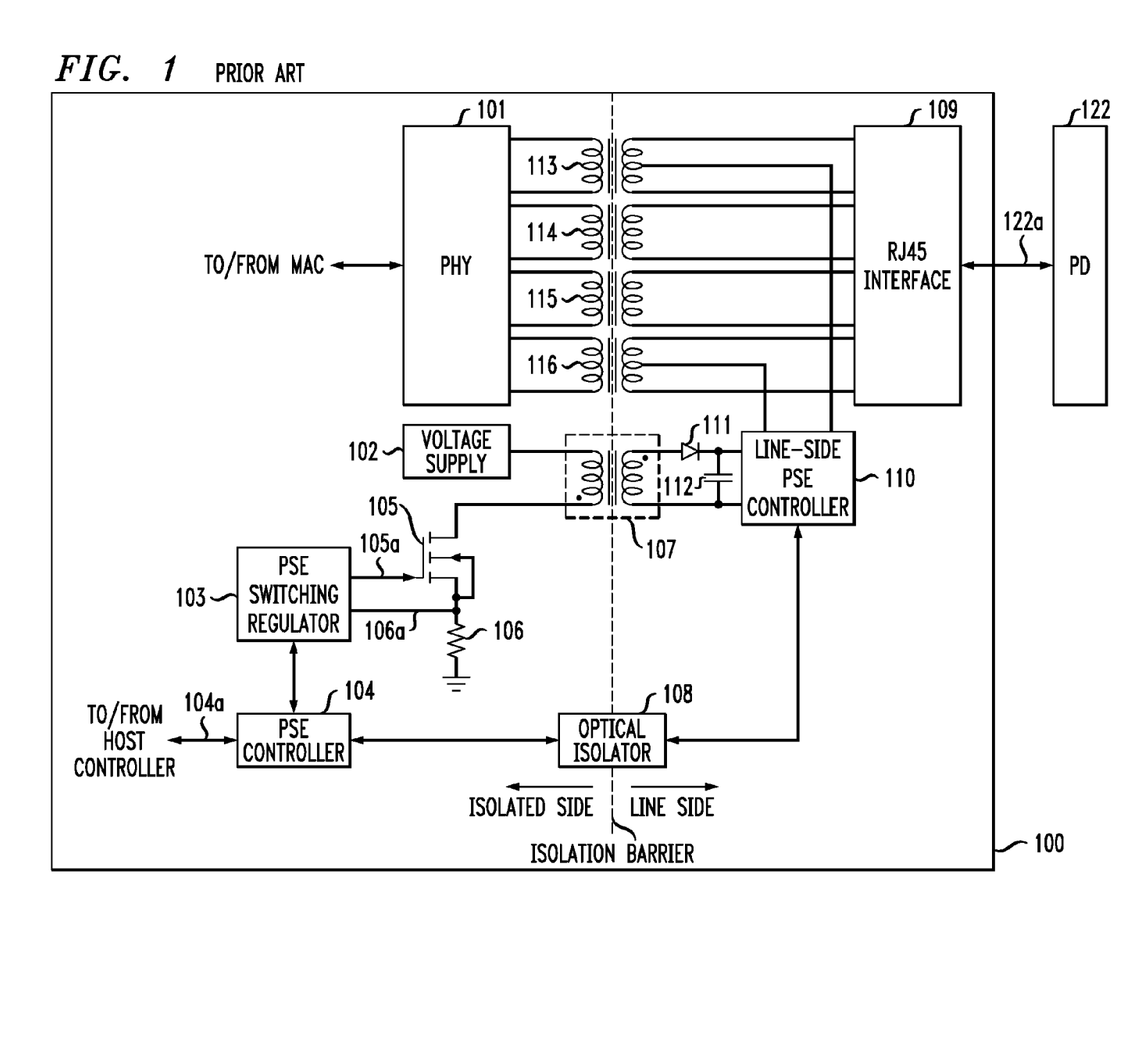
FIG. 1 shows a simplified block diagram of a conventional power sourcing equipment (PSE) port.

FIG. 1 shows a simplified block diagram of conventional power sourcing equipment (PSE) port 100, which is part of a PSE (not shown), which in turn is part of a PoE system that also comprises powered device (PD) 122. PD 122 receives its electrical power from PSE port 100 via path 122a. A PSE can have multiple ports, wherein each port is adapted to connect to a PD. A PD can be, for example, a voice-over-IP (VoIP) telephone, a wireless hub, or a networked camera. PSE port 100 supports Ethernet communication services in accordance with the Ethernet standard, as well as the provision of electrical power in compatibility with the PoE standard. Ethernet communication is supported by physical-layer module (PHY) 101, which connects to RJ45 interface 109 via signal-isolation transformers 113, 114, 115, and 116. RJ45 interface 109 in turn connects to the RJ45 interface (not shown) of PD 122 via cable path 122a, which may include multiple cables, such as category 5 unshielded twisted pair cables, and connectors. PHY 101 also connects to a media access controller (MAC) (not shown).

Transformers 113, 114, 115, and 116 support electrical isolation between the so-called isolated side of PSE port 100 and the so-called line side of PSE port 100. The isolated side is on the primary side of the transformers of PSE port 100, while the line side is on the secondary side of the transformers of PSE port 100. The two sides are isolated by an isolation barrier, represented in FIG. 1 as a dashed line, which helps protect sensitive devices on the isolated side from electrical surges on the line side. The isolation barrier is also supported by power transformer 107 and optical isolator 108. The isolated side of PSE port 100 comprises PHY 101, voltage supply 102, PSE switching regulator 103, PSE controller 104, transistor 105, and current-sense resistor 106. PSE switching regulator 103 can determine the current flowing through transistor 105 by measuring, via path 106a, the voltage across current-sense resistor 106, which has a relatively low resistance value.

The line side of PSE port 100 comprises RJ45 interface 109, line-side PSE controller 110, diode 111, and capacitor 112. PSE port 100 further comprises devices supporting the isolation barrier, specifically, optical isolator 108 and transformers 107, 113, 114, 115, and 116 which are located on both sides of the isolation barrier. It should be noted that ports might share some components. For example, several ports might use the same voltage supply, PSE controller, or line-side PSE controller. Also, single physical components might support multiple ports, such as an octal PHY that can support eight ports. Thus, unless otherwise indicated or necessary, references herein and in the figures to particular elements refer to functional units and do not limit their physical implementation.

PSE port 100 provides electrical power to PD 122 via power transformer 107. The operation of transistor 105 is controlled by PSE switching regulator 103 via path 105a. If transistor 105 is on, then current flows through the primary coil of transformer 107. If transistor 105 is on, then due to diode 111, substantially no current flows through the secondary coil of transformer 107. When transistor 105 is turned off, current substantially stops flowing through the primary coil of transformer 107. Current then starts to flow through the secondary coil of transformer 107 as the electromagnetic energy built up in the primary coil of transformer 107 is transferred to its secondary coil. The current through the secondary coil starts at a level proportional to the current that was flowing through the primary coil, possibly exhibiting an initial spike, and either steadily declines all the way to zero, or drops to zero with the turn-on of transistor 105, which starts the cycle anew.

PSE switching regulator 103 can operate transistor 105 in continuous or discontinuous mode. A single switching cycle comprises two intervals: (i) on, when transistor 105 is turned on, and (ii) off, when transistor 105 is turned off. In discontinuous-mode operation, the current through the secondary coil of transformer 107 drops substantially to zero during the off interval of the switching cycle, i.e., before transistor 105 is turned on again. In continuous-mode operation, the current through the secondary coil of transformer does not drop to zero during the off interval, i.e., before transistor 105 is turned on again. As already noted, in both modes of operation, the current through the secondary coil of transformer 107 is substantially zero during the on interval of a switching cycle.

PSE switching regulator 103 may be controlled by PSE controller 104, which can receive information regarding power usage by PD 122 from line-side PSE controller 110, via optical isolator 108. PSE controller 104 communicates with a host controller (not shown) via path 104a. Alternatively, switching regulator 103 can be set to provide a predefined switching signal, whereupon line-side PSE controller 110 can regulate the actual electrical power provided to PD 122.

Line-side PSE controller 110 can communicate with PSE controller 104 through optical isolator 108. Optical isolator 108 comprises a light-emitting diode (LED) and a phototransistor or photodiode for electrically-isolated transmission of information from the line side to the isolated side. Line-side PSE controller 110 performs several PoE-related functions, including detection, optional classification, and fault monitoring. Detection comprises detecting whether a PoE-compliant PD has been connected to PSE port 100 by measuring currents and/or voltages. Classification comprises attempting to determine the expected power usage of the PD. After the detection of a valid PD, power is provided to the PD.

Before PSE port 100 will provide power via RJ-45 interface 109, it must be determined that a valid PD is connected to PSE port 100 via RJ-45 interface 109. One of the tests used to determine whether a valid PD is connected to PSE port 100 is PoE resistive signature detection. PoE resistive signature detection determines whether the electrical resistance of an attached device is within the allowed range specified by the PoE standard. A valid PD typically includes a front-end containing an element called the signature block that includes a signature resistor. The signature resistor is typically isolated from some other parts of the PD's circuitry until after successful detection of the PD by the PSE.

The PoE standard requires that a valid PD have a signature resistance of 25 k$\Omega$±1.25 k$\Omega$. To account for various components and offsetting effects in a PoE system, the PoE standard requires the PSE to accept as a valid resistive signature measured resistance values of 19-26.5 k$\Omega$. The PoE standard requires a PSE to reject as invalid resistive signatures measured values of less than 15 k$\Omega$ and measured values of greater than 33 k$\Omega$. For intermediate measured values, i.e., 15-19 k$\Omega$ and 26.5-33 k$\Omega$, determination of validity of resistive signature is PSE-implementation-specific.

In the PoE resistive signature detection process, PSE port 100 uses two probing voltages and measures the resultant electrical currents using line-side PSE controller 110, which provides those electrical current measurements to PSE controller 104 via optical isolator 108. Two probing voltages are used to mitigate the effects of voltage offsets in the PD or the path to it. Voltage offsets can be created by components such as diodes. In particular, the signature block of a PD is typically preceded by one or more diode bridges that introduce a voltage offset of approximately two diode-threshold voltages.

For example, if PD 122 is affected by a voltage offset of −1.5V, then using a PSE-side probing voltage of 3V on the signature resistance of 25 k$\Omega$ of PD 122 would produce a current of 0.06 mA (I=V/R=(3V−1.5V)/25 k$\Omega$=0.06 mA). This would result in a PSE-calculated signature resistance of 50 k$\Omega$ (R=V/I=3V/0.06 mA=50 k$\Omega$), which would cause the PSE to erroneously determine that PD 122 is not a valid PD. However, using two probing voltages, $V_1$ and $V_2$, measuring the resultant currents, $I_1$ and $I_2$, respectively, the resistive signature R can be obtained using the formula below:

$$R = \frac{\Delta V}{\Delta I} = \frac{V_2 - V_1}{I_2 - I_1} \qquad (1)$$

Using the sample values above, and a second probing voltage of 10V, which would produce a current of 0.34 mA, the PSE would calculate a resistive signature value of R=(10V−3V)/(0.34 mA−0.06 mA)=25 k$\Omega$, which is the actual value. The latter more-accurate measurement is achieved by mitigating the effects of voltage offsets in the PoE system.

Moving the components performing the functionality of the line-side PSE controller to the isolated side may help reduce the cost of a PSE device by reducing the number of individual components needed since the move would allow the line-side PSE controller to be integrated with the PSE controller of the isolated side on a single integrated circuit, and would allow the optical isolator to be altogether eliminated. Such integration is not, however, obligatory.

Figure 2:
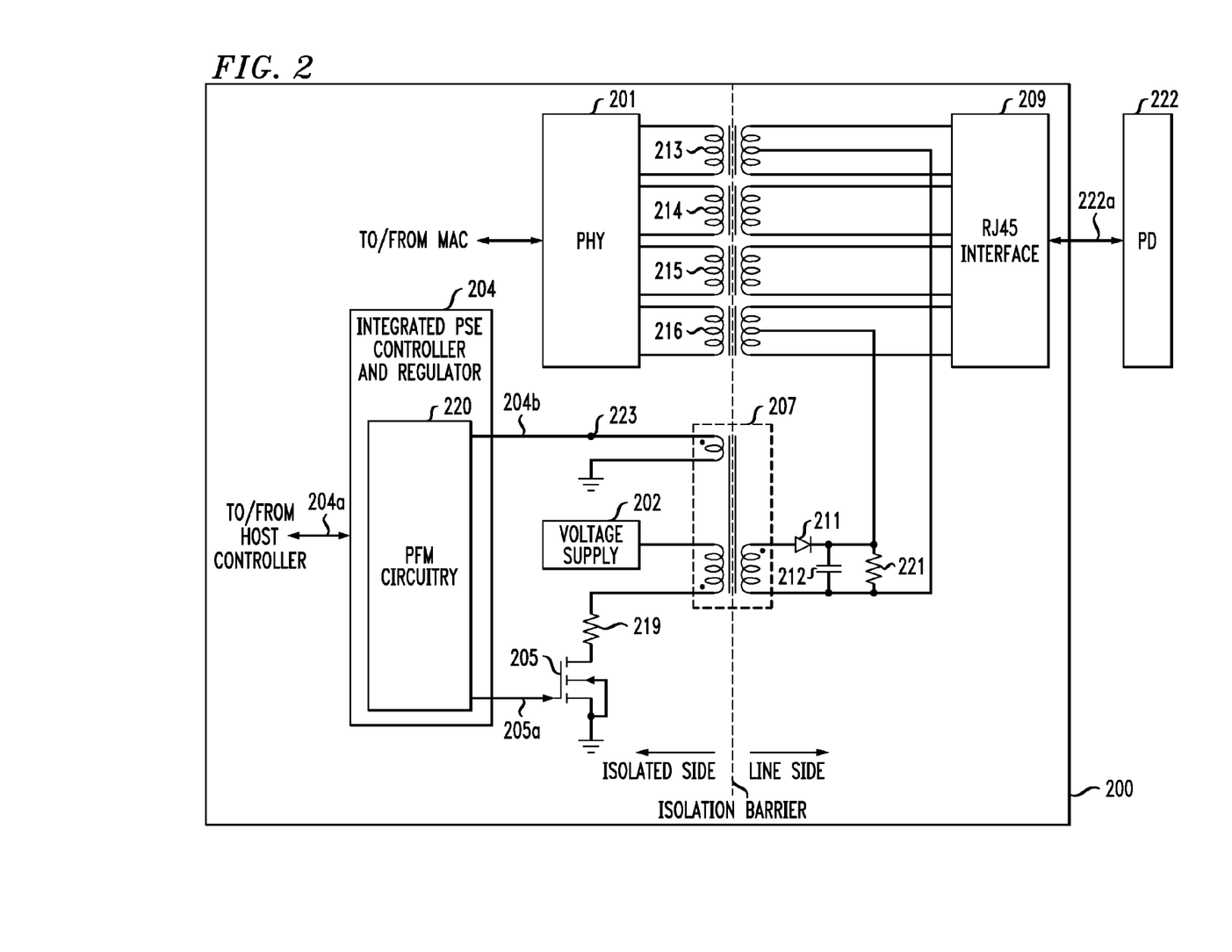
FIG. 2 shows a simplified block diagram of a PSE port in accordance with one embodiment of the present invention.

FIG. 2 shows a simplified block diagram of PSE port 200 in accordance with one embodiment of the present invention. Elements in FIG. 2 that are similar to elements in FIG. 1 are similarly labeled, but with a different prefix. The line side of PSE port 200 comprises RJ45 interface 209, diode 211, smoothing capacitor 212, and optional parallel resistor 221. The isolated side of PSE port 200 comprises PHY 201, voltage supply 202, integrated PSE controller and regulator 204, transistor 205, and current-limiting resistor 219. Supporting the isolation barrier, and having components on both the isolated side and the line side of PSE port 200, are signal-isolation transformers 213, 214, 215, and 216, and power transformer 207. Current-limiting resistor 219 is useful for more precise control and/or determination of the current flowing through the primary coil of power transformer 207. One exemplary implementation of PSE port 200 uses the following values for components: 120Ω for current-limiting resistor 219, 100 kΩ for parallel resistor 221, 5.76 μH for the inductance of the primary coil of transformer 207, and 2 μF for smoothing capacitor 212.

While some functionality has migrated to the isolated side in PSE port 200 as compared to PSE port 100 of FIG. 1, power conditioning has not migrated and continues to be performed on the line side of PSE port 200. Diode 211 and capacitor 212 represent a simple power conditioning circuit; however, power conditioning can be provided by components other than or in addition to diode 211 and capacitor 212. Optional resistor 221 may be placed in parallel with capacitor 212 for purposes such as reduced shutdown time or improved regulation at low loads.

Power transformer 207 comprises three coils: (i) a primary coil connected between voltage supply 202 and resistor 219, (ii) a secondary coil connected to diode 211 and capacitor 212, and (iii) an auxiliary coil connected between integrated PSE controller and regulator 204 and a reference node (e.g., ground). Although FIG. 2 shows the secondary coil outputs connected to a particular pair of signal-isolation transformers, the secondary coil may be connected to any appropriate pair of signal-isolation devices. The voltage across the auxiliary coil of power transformer 207, which can be measured at voltage-sensing node 223, depends on the voltages across the primary coil and/or the secondary coil, as well as the ratios and orientations of turns between the auxiliary coil and the primary and secondary coils.

Integrated PSE controller and regulator 204 combines the functions previously performed by a PSE switching regulator, a PSE controller, and a line-side PSE controller, such as FIG. 1's PSE switching regulator 103, PSE controller 104, and line-side PSE controller 110. Integrated PSE controller and regulator 204 comprises pulse frequency modulation (PFM) circuitry 220.

PFM circuitry 220 measures the voltage across the auxiliary coil of transformer 207, using path 204b, when the voltage across the auxiliary coil is proportional to the voltage across the secondary coil, i.e., when transistor 205 is off. PFM circuitry 220 uses the measure as feedback in regulating the voltage provided to PD 222 by PSE port 200 during resistive signature detection. PFM circuitry 220 controls the operation of transistor 205 via path 205a. PFM circuitry 220 provides a switching signal comprising a series of pulses whose pulse width is substantially constant but whose frequency is variable. During resistive signature detection, PFM circuitry 220 operates in discontinuous mode. The higher the average frequency of the signal provided by PFM circuitry 220, the higher the average voltage provided by PSE port 200 to PD 222, and the higher the average current through the primary coil of transformer 207.

In discontinuous-mode operation, during each switching cycle, the electrical energy flowing through the primary coil of transformer 207 is substantially completely transferred to the secondary coil of transformer 207, subject to the power transfer efficiency of transformer 207, which is a physical and determinable characteristic of transformer 207. The energy $E_{cycle}$ transferred during each switching cycle can substantially be represented by the formula below:

$$E_{cycle} = \eta \cdot \frac{1}{2} L_P \cdot I_{pk}^2 \qquad (2)$$

wherein η is the power-transfer efficiency of transformer 207, $L_P$ is the inductance of the primary coil of transformer 207, and $I_{pk}$ is the current through the primary coil of transformer 207 at the end of the on interval of the switching cycle. In discontinuous-mode operation, current $I_{pk}$ starts at substantially zero at the start of an on switching cycle and rises exponentially towards $V_{in}/R_{lim}$, wherein $V_{in}$ is the voltage supplied by voltage supply 202, and $R_{lim}$ is the resistance of current-limiting resistor 219. If the on interval is appropriately chosen, then $I_{pk}$ is substantially equal to $V_{in}/R_{lim}$ and the energy transferred during each switching cycle can substantially be represented by the formula below:

$$E_{cycle} = \eta \cdot \frac{1}{2} L_P \cdot \left(\frac{V_{in}}{R_{lim}}\right)^2 \qquad (3)$$

The power $P_{prim}(F)$ transferred from the primary coil of transformer 207 to the secondary coil of transformer 207 in discontinuous-mode operation at a switching frequency F can substantially be represented by the formula:

$$P_{prim} = (F) = E_{cycle} \cdot F = F \cdot \eta \cdot \frac{1}{2} L_P \cdot \left(\frac{V_{in}}{R_{lim}}\right)^2 \qquad (4)$$

wherein F is the switching frequency, and $E_{cycle}$ is the energy transferred during each switching cycle, as determined, e.g., by using formula (3).

If integrated PSE controller and regulator 204 is operating in steady-state mode, wherein steady-state operation indicates that a relatively constant regulated voltage is provided to the line side of transformer 207, and there is no voltage offset affecting measurements, then the power $P_{sec}$ dissipated by the secondary side, or line side, of transformer 207, which includes power dissipated by PD 222, can be represented as a function of voltage and resistance by the formula:

$$P_{sec} = \frac{V^2}{R_{TLS}} \qquad (5)$$

wherein V is the regulated voltage on the line side, and $R_{TLS}$ is the total line-side resistance, which is substantially equal to the PD signature resistance $R_{load}$ as affected by any parallel resistors in PSE port 200, such as resistor 221. The total line-side resistance $R_{TLS}$ can be represented by the formula:

$$R_{TLS} = \frac{R_{load} \cdot R_{ll}}{R_{load} + R_{ll}} \qquad (6)$$

wherein $R_{ll}$ is the total resistance of any resistors, such as resistor 221, in parallel to the resistive signature resistor of PD 222.

In steady-state discontinuous-mode operation of transformer 207, the power transferred from the primary coil of transformer 207 is substantially equal to the power dissipated on the secondary side of transformer 207, i.e.:

$$P_{prim}(F) = P_{sec} \qquad (7)$$

By substituting equations (4) and (5) into equation (6), moving terms, and taking the square roots of both sides, one gets the equation below:

$$\sqrt{F} = \frac{V}{\frac{V_{in}}{R_{lim}} \cdot \sqrt{\eta \cdot \frac{L_P}{2} \cdot R_{TLS}}} \quad (8)$$

If PD 222 is affected by a voltage offset $V_{offset}$, then calculating the power dissipated by the secondary side is more complicated than using formula (5) and could substantially be accomplished using the formula below:

$$P_{sec} = \frac{V^2}{R_{ll}} + \frac{(V - V_{offset})^2}{R_{load}} \quad (9)$$

The value of any offset voltage affecting PD 222 is not necessarily a known or easily-measurable quantity by integrated PSE controller and regulator 204. Another way to mitigate the effects of an offset voltage is by performing measurements at two controlled voltages, similar in principle to the way in which the effect of a voltage offset is substantially eliminated in the prior art. Using differential voltage measurements in combination with equation (8) generates the equation:

$$\Delta\sqrt{F} = \sqrt{F_2} - \sqrt{F_1} \quad (10)$$
$$= \frac{V_2 - V_1}{\frac{V_{in}}{R_{lim}} \cdot \sqrt{\eta \cdot \frac{L_P}{2} \cdot R_{TLS}}}$$

wherein $V_2$ and $V_1$ are the two applied probing voltages and $F_2$ and $F_1$ are the corresponding frequencies of the switching signal controlling transistor 205 and remaining corrective terms due to the offset in the presence of $R_{ll}$ are omitted and are less than $(1/(1+R_{ll}/R_{load})) \cdot 0.125 \cdot V^2_{offset}/V_1 \cdot V_2$. The differential measurements make first-order terms of the order of $V_{offset}/V_1$ and $V_{offset}/V_2$ cancel each other out. All corrective terms cancel each other if there is no parallel resistor, i.e., $R_{ll}$ is infinite. For the voltages of interest in this embodiment, the corrective terms become negligible. For example, if $V_{offset}=1.5V$, $V_1=4V$, $V_2=8V$, $R_{load}=25$ k$\Omega$, and $R_{ll}=100$ k$\Omega$, then $(1/(1+R_{ll}/R_{load})) \cdot 0.125 \cdot V^2_{offset}/V_1 \cdot V_2$ is approximately 0.18%. Equation (10) can be used to determine, with reasonable accuracy, $R_{TLS}$, and then equation (6) can be used to determine the value of $R_{load}$ and subsequently, whether $R_{load}$ is a valid signature resistance. It should be noted that, if parallel resistor 221 is not present in PSE port 200, then $R_{ll}$ is effectively an open circuit, and $R_{TLS}$ is substantially equal to $R_{load}$.

The values for $V_{in}$, $R_{lim}$, $\eta$, $L_P$, and $R_{ll}$ are known to integrated PSE controller and regulator 204 before PD 222 is attached to PSE port 200 via path 222a. Various triggers may be set to prompt integrated PSE controller and regulator 204 to attempt to detect the attachment of a valid PD. For example, integrated PSE controller and regulator 204 could attempt to detect a valid PD intermittently, with intervals determined by a system clock. If integrated PSE controller and regulator 204 determines to attempt to detect a valid PD, then PFM circuitry 220 operates transistor 205 in a discontinuous mode, wherein a first average current flows through the primary coil of transformer 207, so that a steady-state voltage measured at node 223 indicates that voltage $V_1$ is provided to the secondary side of transformer 207. The corresponding frequency $F_1$ is cached. Next, PFM circuitry 220 operates transistor 205 in a discontinuous mode, wherein a different average current flows through the primary coil of transformer 207, so that a steady-state voltage measured at node 223 indicates that voltage $V_2$ is provided to the secondary side of transformer 207. The corresponding frequency $F_2$ is cached. Using the above known and measured values and equations (6) and (10), the value of $R_{load}$ is determined. The determined value of $R_{load}$ is then compared to the predetermined threshold values for signature resistance to determine whether $R_{load}$ is a valid signature resistance.

In order to reduce the quantity and/or complexity of repetitive calculations performed by integrated PSE controller and regulator 204, threshold values may be determined for $\Delta\sqrt{F}$ based on the predetermined signature resistance threshold values for $R_{load}$ and the known equation values discussed above. Thus, after $F_1$ and $F_2$ are determined, as in the procedure described above, the difference of their square roots, i.e., $\Delta\sqrt{F}$, is calculated and compared to the predetermined $\Delta\sqrt{F}$ threshold values to determine whether the corresponding load resistance $R_{load}$ is a valid signature resistance.

Figure 3:
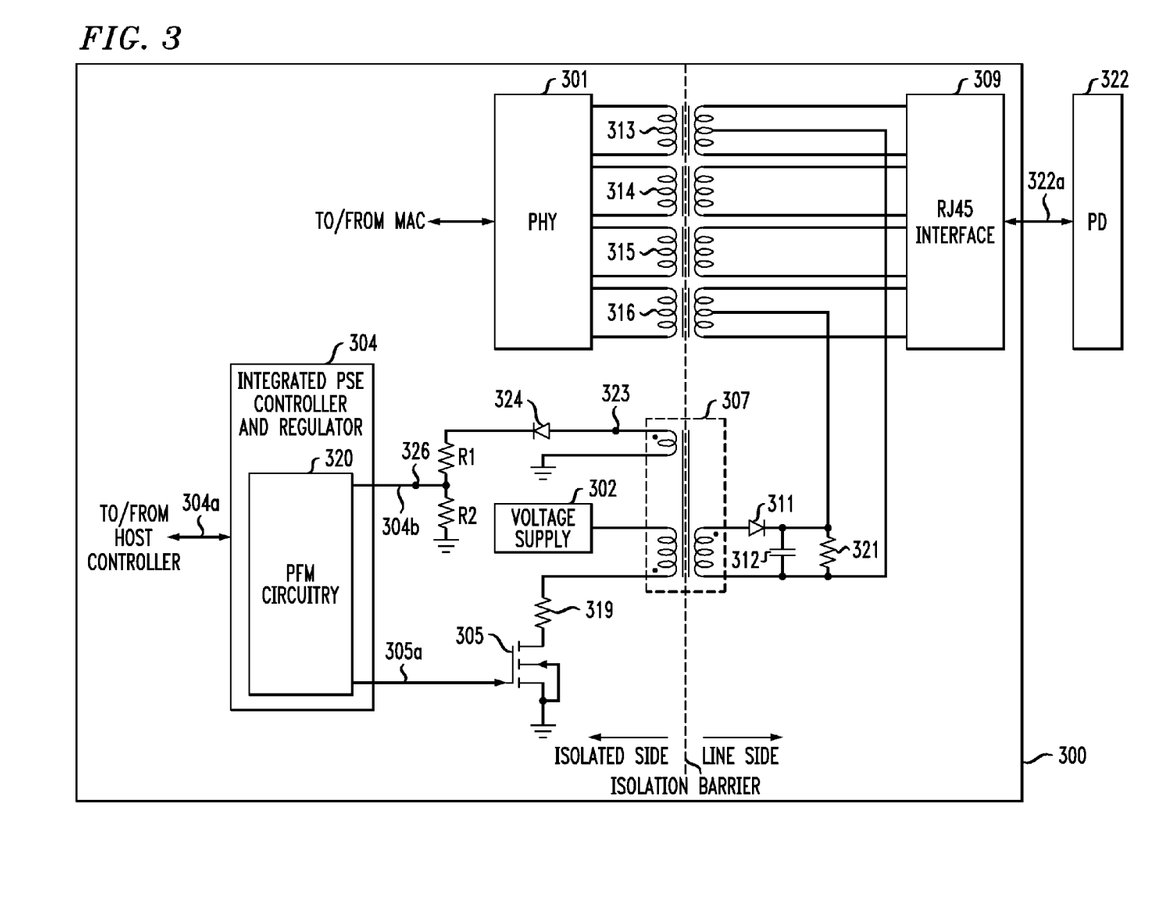
FIG. 3 shows a simplified block diagram of a PSE port in accordance with another embodiment of the present invention.

For example, using the sample component values given above, i.e., $V_{in}=12V$, $L_P=5.76$ μH, $R_{lim}=120\Omega$, a power transfer efficiency $\eta$ of 0.85, and an acceptable measured $R_{load}$ range of 17-30 k$\Omega$, but wherein parallel resistor 321 is not present, i.e., $R_{ll}=\infty$, would result in $\Delta\sqrt{F}$ allowable range of approximately 147.6-196 $\sqrt{Hz}$. Then, supposing the connection of a valid PD 322 with a resistive signature of 25 k$\Omega$, using probing voltages of 4V and 8V would result in corresponding switching frequencies of approximately 26.1 kHz and 104.6 kHz, respectively, and would result in a $\Delta\sqrt{F}$ of approximately 162 $\sqrt{Hz}$, which is within the allowed range, and thus, indicating a valid resistive signature for PD 322.

FIG. 3 shows PSE port 300 in accordance with an embodiment of the present invention. Unless otherwise indicated, elements in FIG. 3 that are similar to corresponding elements of FIG. 2 are similarly labeled, but with a different prefix. PSE port 300 comprises (i) RJ45 interface 309, diode 311, capacitor 312, and optional resistor 321 on the line side; (ii) PHY 301, integrated PSE controller and regulator 304, transistor 305, voltage supply 302, current-limiting resistor 319, resistors R1 and R2, and diode 324 on the isolated side; and (iii) transformers 313, 314, 315, 316, and 307 on both the line and isolated sides, supporting the isolation barrier.

Diode 324 prevents the flow of current through the auxiliary coil of power transformer 307 if transistor 305 is on, i.e., during the on intervals when current is flowing through the primary coil of transformer 307. As noted above, during the on interval, the voltage across the auxiliary coil, which can be measured at voltage-sensing node 323, is substantially proportional to the voltage across the primary coil and/or the voltage across the secondary coil. Because of the arbitrary voltage drop across the reverse-biased diode 311, information about the output voltage of interest is not directly provided by the auxiliary coil of transformer 307 during the on interval. Thus, using diode 324 reduces the overall electrical power consumed by PSE port 300 without materially degrading the ability of integrated PSE controller and regulator 304 to monitor the voltage on the line side. Diode 324 is also useful to help avoid negative voltages from getting provided to integrated PSE controller and regulator 304.

Resistors R1 and R2 form a voltage divider for the voltage across the auxiliary coil of transformer 207. The output of the voltage divider, measurable at voltage-sensing node 326, is provided to integrated PSE controller and regulator 304 via voltage feedback path 304b. By scaling down the voltage across the auxiliary coil of transformer 307, as would be measurable at node 323, the voltage divider allows integrated PSE controller and regulator 304 to measure voltages higher than it might normally be able to safely handle. Sample values for R1 and R2 are 15 kΩ and 5 kΩ, respectively, which would scale down the voltage value at node 323 by a factor of 4. Appropriate scaling of the voltage sensed by integrated PSE controller and regulator 304 is performed to account for the resistor ratio of the voltage divider.

In one embodiment, integrated PSE controller and regulator 304 periodically attempts to detect the presence of a valid PD connected to PSE port 300. If there is no PD connected, then the load is an open circuit, i.e., $R_{load}=\infty$. PFM circuitry 320 initiates a PFM switching signal at a low frequency. Since there is no load connected, capacitor 312 is charged, and the voltage across the secondary coil of transformer 307 continually rises. PFM circuitry 320 will fail to regulate that voltage, indicating the absence of a valid signature resistance, and the detection attempt is terminated. Before the next detection attempt, capacitor 312 may be discharged, e.g., through parallel resistor 321, or other discharge means (not shown). Alternatively, PSE port 300 could operate such that capacitor 312 might not be discharged after a detection attempt unless a valid PD is connected to PSE port 300. In that case, if another detection attempt is made, then the voltage across the secondary coil of transformer 307 will start at a value that is too high, indicating the absence of a valid signature resistance, and the detection attempt can terminate faster.

In one embodiment, PD 322 is not a valid PD, but rather comprises a short circuit, i.e., $R_{load}=0\Omega$. If integrated PSE controller and regulator 304 attempts to detect the presence of a valid PD connected to PSE port 300, then PFM circuitry 320 initiates a PFM switching signal at a low frequency. Since there is a short circuit, the measured voltage remains at substantially 0V. As the frequency of the switching signal is raised, the measured voltage remains at substantially 0V, indicating the absence of a valid signature resistance, and the detection attempt is terminated.

Figure 4:
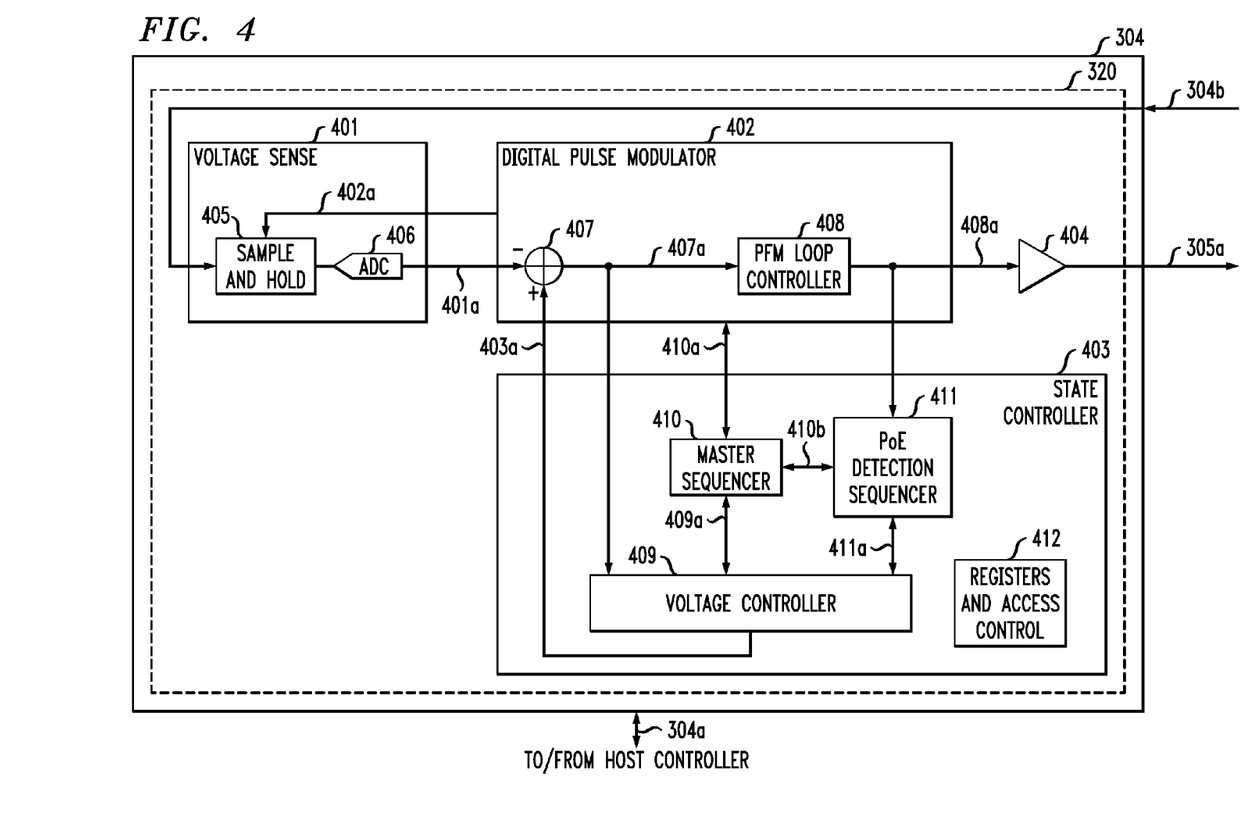
FIG. 4 shows a simplified block diagram of an implementation of the integrated PSE controller and regulator of FIG. 3.

FIG. 4 shows a simplified block diagram of an implementation of integrated PSE controller and regulator 304 of FIG. 3, which comprises PFM circuitry 320. PFM circuitry 320 comprises voltage-sensing module 401, digital pulse modulator 402, state controller 403, MOSFET driver 404, as well as additional components (not shown) as appropriate. Voltage-sensing module 401 senses the voltage at node 326, which is a function of the voltage at node 323, as modified by diode 324 and the voltage divider comprising resistors R1 and R2. Voltage-sensing module 401 comprises sampler 405 and analog-to-digital converter (ADC) 406. Sampler 405 samples the voltage at node 326 via path 304b, as triggered by digital pulse modulator 402 via path 402a, and holds the sampled voltage value. The triggering occurs so as to get an accurate measure of the voltage on the secondary side of transformer 307. For example, the sampling triggering can be set to occur a brief offset period after the downtick of a switching pulse generated by digital pulse modulator 402, i.e., during the early part of an off interval of transistor 305. A temporal offset is used to avoid sampling error that may result from transient effects immediately after a pulse downtick.

Sampler 405 provides the held sampled voltage value to ADC 406, which converts an analog voltage input value into a digital value, which is then provided to digital pulse modulator 402 via path 401a. Digital pulse modulator comprises 402 subtractor 407 and PFM loop controller 408. Based, in part, on the output of subtractor 407, PFM loop controller 408 generates a switching signal that is provided, via path 408a, to MOSFET driver 404, which amplifies the switching signal and uses it to drive transistor 305 via path 305a.

State controller 403 controls the voltage regulation and pulse-frequency modulation functions of PFM circuitry 320. State controller 403 comprises voltage controller 409, master sequencer 410, PoE detection sequencer 411, and registers and access control module 412. Registers and access control module 412 contains memory registers that cache values used by other elements of PFM circuitry 320. For example, the cached values can include frequency values, period values, and voltage values. Registers and access control module 412 communicates with other elements of PFM circuitry 320 through appropriate paths (not shown). Master sequencer 410 controls voltage controller 409 and PoE detection sequencer 411 via paths 409a and 410b, respectively. Master sequencer 410 also controls digital pulse modulator 402 via path 410a. Voltage controller 409 provides to digital pulse modulator 402, via path 403a, in appropriate digital format, a desired voltage value, i.e., a reference voltage value, scaled as appropriate to account for any necessary scaling factors.

A desired voltage is determined by master sequencer 410 and provided to voltage controller 409 for scaling and provision to digital pulse modulator 402. Inside digital pulse modulator 402, subtractor 407 subtracts the measured voltage value received via path 401a from the reference voltage value received via path 403a to output a voltage error value via path 407a, which is provided to voltage controller 409 and PFM loop controller 408. If the voltage on the secondary side of transformer 307 is higher than the voltage value desired for it, then voltage error output 407a is negative. If the voltage on the secondary side of transformer 307 is lower than the voltage value desired for it, then voltage error output 407a is positive.

Voltage controller 409 uses voltage error output 407a to determine whether the feedback loop is locked, i.e., whether the voltage error is sufficiently close to zero to indicate that the voltage on the secondary side of transformer 307 is steady and substantially equal to the voltage value desired for it. In a typical implementation of this embodiment, loop locking takes several hundred clock cycles, which is equivalent to a millisecond or two where the system clock period is in the single-digit microseconds range. If voltage controller 409 determines that the loop is locked, then voltage controller 409 notifies master sequencer 410 via path 409a. This notification can be used as a trigger by master sequencer 410, for example, to have PoE detection sequencer 411 determine the PFM average switching frequency corresponding to the desired voltage value over a sufficiently long time window, e.g., 10 ms for the system parameters already referenced.

PoE detection sequencer 411 receives as an input, via path 408a, the switching signal generated by PFM loop controller 408. Using the switching signal, PoE detection sequencer 411 calculates an average PFM frequency for the corresponding voltage value, which PoE detection sequencer 411 receives from voltage control 409 via path 411a. PoE detection sequencer 411 determines the frequencies corresponding to the two probing voltages used, then determines the difference of their square roots, i.e., $\Delta\sqrt{F}$, then compares the resultant $\Delta\sqrt{F}$ to the pre-determined $\Delta\sqrt{F}$ threshold values for the two probing voltages used, which are based on the known component values, as discussed above, and then provides the result to master sequencer 410 for further action dependent on whether the resultant $\Delta\sqrt{F}$ indicates that $R_{load}$ is a valid signature resistance or not.

In an alternative embodiment, PoE detection sequencer uses the known and determined values discussed above to determine the resistance value of $R_{load}$. The determined value is then compared to $R_{load}$ threshold values, and the result of the comparison is provided to master sequencer 410 for further action consistent with the result.

Figure 5:
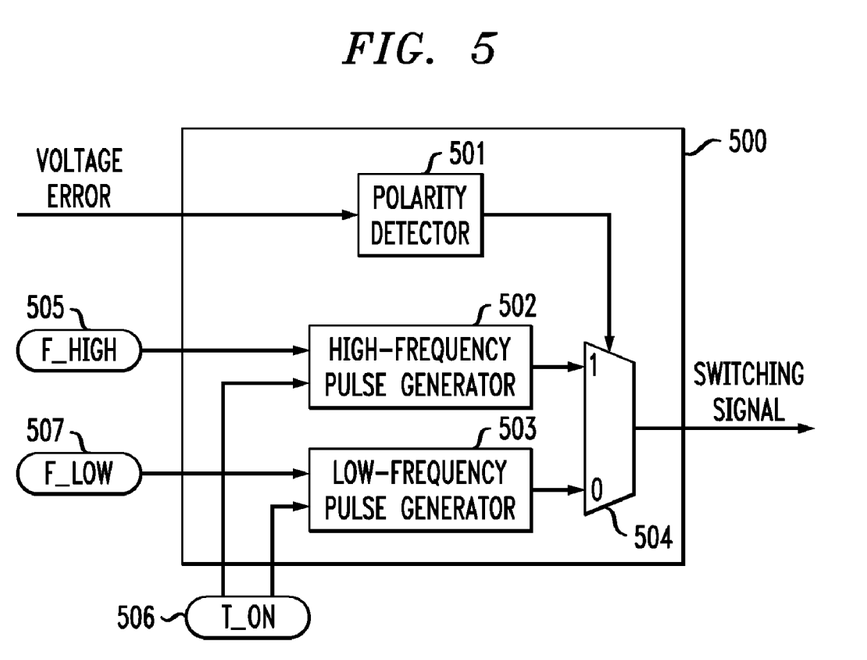
FIG. 5 shows a simplified block diagram of an implementation of the PFM loop controller of FIG. 4.

FIG. 5 shows a simplified block diagram of PFM loop controller 500, which is one possible implementation of PFM loop controller 408 of FIG. 4. PFM loop controller 500 is a hysteretic- or "bang-bang"-type controller. PFM loop controller 500 comprises polarity detector 501, high-frequency pulse generator 502, low-frequency pulse generator 503, and mux 504. High-frequency pulse generator 502 receives as inputs (i) a high-frequency value from high-frequency register 505, and (ii) a time-on (T_on) value from time-on register 506. Low-frequency pulse generator 503 receives as inputs (i) a low-frequency value from low-frequency register 507, and (ii) the time-on value from time-on register 506. The registers can be located in an element such as registers and access control module 412 of FIG. 4.

Each pulse generator uses its inputs to generate a switching signal at the input frequency wherein each pulse is of the width indicated by the input time-on value. In one alternative implementation, the frequency and/or time-on values are programmable by other means, as would be appreciated by one of ordinary skill in the art. In another alternative implementation, the frequency and time-on values are hard-wired and are not programmable; thus, the pulse generators do not require the described inputs and the described memory registers are not needed.

The switching signal generated by high-frequency pulse generator 502 is provided to the high, or "1" input of mux 504. The switching signal generated by low-frequency pulse generator 503 is provided to the low, or "0" input of mux 504. Mux 504 is controlled by the output of polarity detector 501. Polarity detector receives as an input a voltage error signal, such as the signal on path 407a of FIG. 4. If the voltage error is positive, i.e., the actual voltage needs to be increased, then polarity detector 501 outputs a "1," and consequently mux 504 provides, as an output switching signal of PFM loop controller 500, the high-frequency switching signal from high-frequency pulse generator 502. If the voltage error is negative, i.e., the actual voltage needs to be reduced, then polarity detector 501 outputs a "0," and consequently mux 504 provides, as an output of PFM loop controller 500, the low-frequency switching signal from low-frequency pulse generator 503.

The high-frequency value is selected so that the corresponding resultant voltage value is equal to or greater than the highest voltage value desired. The low-frequency value is selected so that the corresponding resultant voltage value is equal to or less than the lowest voltage value desired. Thus, in steady-state operation, a steady-state ratio is achieved by PFM loop controller between provision of the high-frequency switching signal and the low-frequency switching signal, wherein the voltage error hovers near and around zero, alternating between negative and positive.

Figure 6:
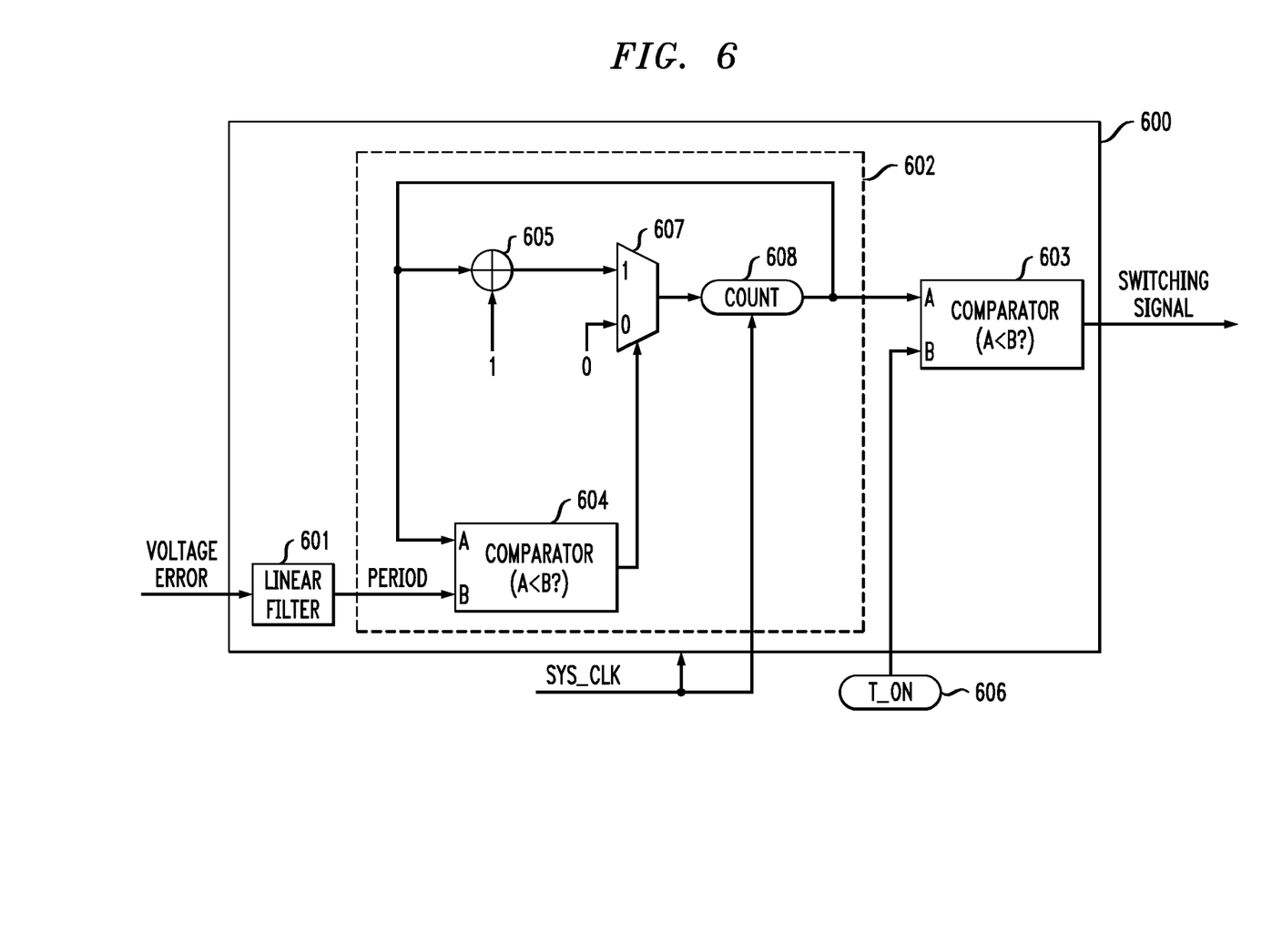
FIG. 6 shows a simplified block diagram of an alternative implementation of the PFM loop controller of FIG. 4.

FIG. 6 shows a simplified block diagram of PFM loop controller 600, which is an alternative implementation of PFM loop controller 408 of FIG. 4. PFM loop controller 600 is a linear-type PFM loop controller. PFM loop controller 600 comprises linear filter 601, counter 602, and comparator 603. Linear filter 601 can be implemented, for example, by an integrator followed by a multiplier (not shown). Linear filter 601 receives, as an input, a voltage error signal, such as the signal on path 407a of FIG. 4. Based on the voltage error, linear filter 601 determines a switching period value that is output to counter 602. The more positive the voltage error value, i.e., the more the measured voltage needs to increase, the higher the switching frequency needs to be raised, and thus, the lower the switching period value. The more negative the voltage error value, i.e., the more the measured voltage needs to decrease, the lower the switching frequency needs to be reduced, and thus, the higher the switched period value.

The switching period value provided to counter 602 is in the form of units of system clock SYS_CLK periods. Counter 602 cyclically counts the specified number of SYS_CLK units, resets to zero after the specified number of SYS_CLK units is reached, and starts the count anew. The count number is provided to input A of comparator 603. Time-on register 606 provides a time-on value, also in terms of SYS_CLK periods, to input B of comparator 603. If the value on input A of comparator 603 is less than the value on input B, then comparator 603 outputs a "1"; otherwise, comparator 603 outputs a "0." Thus, substantially from the SYS_CLK cycle in which counter 602 resets to substantially the SYS_CLK cycle in which the value of counter 602 equals or exceeds the turn-on time value from T_on register 606, the output of comparator 603 is high. From substantially the SYS_CLK cycle in which the value of counter 602 equals or exceeds the turn-on time value from T_on register 606 to substantially the SYS_CLK cycle in which counter 602 resets, which depends on the period value output by linear filter 601, the output of comparator 603 is low. Thus, the output of comparator 603, and consequently, of PFM loop controller 600, is a switching signal whose pulse width is determined by T_on register 606 and whose period depends on the filtered voltage error value determined.

In an alternative embodiment, the pulse width is hard-wired and is not programmable, and consequently, comparator 603 does not require an input B, and T_on register 606 is not needed. In another alternative embodiment, the pulse width is set by other means (not shown), as would be appreciated by one of ordinary skill in the art.

FIG. 6 shows one implementation of counter 602. Counter 602 comprises comparator 604, adder 605, mux 607, and count register 608. Comparator 604 receives (i) at input A, the output of count register 608, and (ii) at input B, the switching period value output from linear filter 601. The output of comparator 604 is high if the value of input A is less than the value of input B, and low otherwise. The output of comparator 604 controls the operation of mux 607. If the output of comparator 604 is low, then mux 607 outputs a "0." If the output of comparator 604 is high, then mux 607 outputs the value output by adder 605, which is one more than the present output of count register 608. Count register 608 refreshes every SYS_CLK cycle getting the output of mux 607. Thus, the value stored in count register 608 increments substantially every cycle that the value is less than the switching period value specified by linear filter 601, and the value is reset to zero if the value is equal to or greater than the switching period value specified by linear filter 601. Thus, the voltage error input to PFM loop controller 600 determines the frequency of the switching signal output by PFM loop controller 600.

Figure 7:
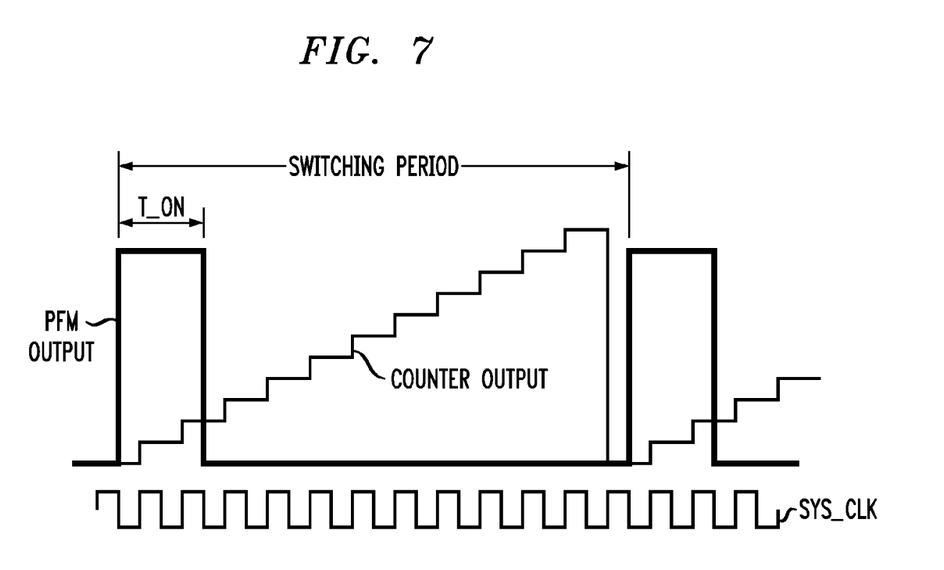
FIG. 7 shows a sample signal timing diagram for some signals of an implementation of the linear PFM loop controller of FIG. 6.

FIG. 7 shows a sample signal timing diagram for some signals of an implementation of PFM loop controller 600 of FIG. 6. In the sample shown, the switching period value is 11 SYS_CLK cycles and the time-on period is 2 SYS_CLK cycles. Count register 608 updates substantially on the uptick of SYS_CLK, and its value increments by one every SYS_CLK uptick until the value reaches 11, after which count register 608 resets to zero and starts incrementing anew. Comparator 603 refreshes substantially on the downtick of SYS_CLK and the output of comparator 603 goes high after count register 608 resets to zero. The output of comparator 603 stays high until the value output by count register 608 equals or exceeds the value output by time-on register 606, after which the output of comparator 603 goes low until after count register 608 resets to zero.

In an alternative embodiment, in order to minimize errors that may be caused by a variance in the voltage provided by voltage supply 302 of FIG. 3, prior to resistive signature detection, the output of voltage supply 302 may be measured by integrated PSE controller and regulator 304 (specific circuitry not shown). The measured voltage value can then be used in the calculations discussed above for compensating voltage-supply variations compared to nominal values, thereby providing more accurate results. The measured value can be used directly in calculating the load resistance. Alternatively, if $\Delta\sqrt{F}$ threshold values are used which were obtained using the nominal voltage source value, then correction factors based on the measured value can be used to adjust the threshold values or the $\Delta\sqrt{F}$ value determined by integrated PSE controller and regulator 304.

Exemplary embodiments have been described with a PFM circuitry controlling a transistor connected to a reference voltage on one side and to a voltage source, via a primary coil of a power transformer and a current-limiting resistor, on the other side. PFM circuitry is used in those exemplary embodiments because it generally allows finer control of lower voltages and lower power consumption than, e.g., pulse-width modulation (PWM) circuitry. However, as would be appreciated by one of ordinary skill in the art, PWM or other circuitry could be used instead of PFM circuitry to control the operation of the transistor and corresponding power transformer.

The embodiments described herein are exemplary. As would be appreciated by one of ordinary skill in the art, numerous variations, such as alternative power-conversion topologies, polarity inversions, path reroutes, and value scalings, are possible that would not depart from the scope of the present invention. For example, instead of employing an auxiliary coil, the primary coil of power transformer 307 of FIG. 3 can be used, with appropriate wiring and additional components, to sense the voltage across the secondary coil of transformer 307 when transistor 305 is off.

Exemplary embodiments of a PSE port have been described wherein a current-limiting resistor is located between a transistor and a primary coil of a power transformer. However, the current-limiting resistor may be placed instead between the transistor and a reference voltage, e.g., ground, without departing from the scope or spirit of the invention.

An exemplary embodiment of a PFM circuitry has been described wherein an average pulse frequency is determined by a state controller, such as state controller 403 of FIG. 4, based on an output of a PFM loop controller, such as PFM loop controller 408 of FIG. 4. However, the average frequency can be determined by any suitable element of a PFM circuitry. For example, in an alternative embodiment, an element inside a digital pulse modulator, such as digital pulse modulator 402 of FIG. 4, determines the average pulse frequency based on an output of the PFM loop controller and provides the determined average to the state controller, which consequently does not need to receive as an input the output of the PFM loop controller.

The embodiments of the invention described herein provide electrical power to the PD using a so-called flyback converter. As would be appreciate by a person of ordinary skill in the art, other power converters, e.g., Cuk, forward, boost, buck, SEPIC, etc., can be used instead, with appropriate modifications, as would be understood by the person of ordinary skill in the art.

Although the present invention has been described in the context of communication systems conforming to the IEEE 802.3 Ethernet and IEEE 802.3af PoE standards, the invention is not necessarily limited to communication systems that conform to either or both of those two standards. Moreover, as those standards may evolve over time, it is expected that implementations of the present invention can also evolve in a corresponding manner.

Although this specification describes Ethernet devices using four signal-isolation transformers and four wire pairs, the teachings of this specification apply equally well to devices using only two signal-isolation transformers and two wire pairs, or Ethernet devices using other isolation means.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing steps in a software program. Such software may be employed in, for example, a digital signal processor, microcontroller, or general-purpose computer.

It will be further understood that various changes in the details, materials, and arrangements of the parts which have been described and illustrated in order to explain the nature of this invention may be made by those skilled in the art without departing from the scope of the invention as expressed in the following claims.

Although the steps in the following method claims are recited in a particular sequence with corresponding labeling, unless the claim recitations otherwise imply a particular sequence for implementing some or all of those steps, those steps are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Unless explicitly stated otherwise, each numerical value and range should be interpreted as being approximate as if the word "about" or "approximately" preceded the value of the value or range. As used in this application, unless otherwise explicitly indicated, the term "connected" is intended to cover both direct and indirect connections between elements. The terms "connect," "connected," or "connection" as used herein refer to a linking that allows the transmission of electromagnetic signals. The transmission (1) may be through one or more media, (2) may be either unidirectional or bidirectional, and (3) may be direct or indirect, in which case the linking includes one or more intermediary devices. For example, transmission may take place via electrically conductive elements, radio-frequency (RF) wireless signals, infra-red (IR) wireless signals, optical fibers, capacitive coupling, magnetic coupling, or any other suitable means of signal transmission.

Unless indicated otherwise, the term "determine" and its variants as used herein refer to obtaining a value through measurement and, if necessary, transformation. For example, to determine an electrical-current value, one may measure a voltage across a current-sense resistor, and then multiply the measured voltage by an appropriate value to obtain the electrical-current value. If the voltage passes through a voltage divider or other voltage-modifying components, then appropriate transformations can be made to the measured voltage to account for the voltage modifications of such components and to obtain the corresponding electrical-current value.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

The invention claimed is:

1. A method for characterizing a load connected to power sourcing equipment (PSE) having a power transformer having (i) an isolated side with a primary coil and (ii) a line side with a secondary coil connected to the load, the method comprising:
    (a) generating, on the isolated side, a switching signal having a first frequency and used to generate an electrical current through the primary coil;
    (b) generating, on the isolated side, a first voltage measurement corresponding to a first line-side voltage across the secondary coil resulting from the electrical current provided to the primary coil;
    (c) characterizing the load based on the first voltage measurement and the first frequency;
    (d) generating the switching signal at a second frequency, different from the first frequency, to provide a different electrical current through the primary coil; and
    (e) generating, on the isolated side, a second voltage measurement corresponding to a second line-side voltage across the secondary coil resulting from the different electrical current provided to the primary coil, wherein the load is characterized based on the first and second voltage measurements and the first and second frequencies.

2. The method of claim 1, wherein:
step (c) comprises generating a measure indicative of the resistance of the load; and
further comprising comparing the measure to one or more specified threshold values to determine whether or not the load corresponds to a valid powered device (PD) connected to receive operating power from the PSE.

3. The method of claim 1, wherein the first voltage measurement is generated using an auxiliary coil located on the isolated side of the power transformer.

4. The method of claim 1, wherein:
the isolated side further comprises a transistor connected in series with the primary coil and a current-limiting resistor, wherein the transistor, primary coil, and the current-limiting resistor are connected between a voltage source and a reference voltage; and
the switching signal controls the transistor to generate the electrical current through the primary coil.

5. The method of claim 4, wherein the first frequency F is substantially related to the first line-side voltage V by:

$$\sqrt{F} = \frac{V}{\frac{V_{in}}{R_{lim}} \cdot \sqrt{\eta \cdot \frac{L_P}{2} \cdot R_{TLS}}}$$

wherein $V_{in}$ is voltage provided by the voltage source, $R_{lim}$ is resistance of the current-limiting resistor, $\eta$ is power transfer efficiency between the primary coil and the secondary coil of the power transformer, $L_P$ is inductance of the primary coil, and $R_{TLS}$ is a total line-side resistance value that is a function of resistance of the load.

6. The method of claim 5, wherein the total line-side resistance value $R_{TLS}$ is substantially related to resistance $R_{load}$ of the load by:

$$R_{TLS} = \frac{R_{load} \cdot R_{ll}}{R_{load} + R_{ll}}$$

wherein $R_{ll}$ is total resistance of one or more resistors connected in parallel to the load.

7. The method of claim 1, wherein:
step (c) comprises generating a measure indicative of the resistance of the load; and
further comprising comparing the measure to one or more specified threshold values to determine whether or not the load corresponds to a valid powered device (PD) connected to receive operating power from the PSE.

8. The method of claim 7, wherein the measure is a difference of square roots of the first and second frequencies.

9. The method of claim 7, wherein the measure is the resistance value of the load.

10. The method of claim 1, wherein:
the isolated side further comprises a transistor connected in series with the primary coil and a current-limiting resistor, wherein the transistor, primary coil, and the current-limiting resistor are connected between a voltage source and a reference voltage;
the switching signal controls the transistor to generate the electrical current and the different electrical current through the primary coil; and
the first and second frequencies $F_1$ and $F_2$ are substantially related to the corresponding first and second line-side voltages $V_1$ and $V_2$ by:

$$\Delta\sqrt{F} = \sqrt{F_2} - \sqrt{F_1}$$
$$= \frac{V_2 - V_1}{\frac{V_{in}}{R_{lim}} \cdot \sqrt{\eta \cdot \frac{L_P}{2} \cdot R_{TLS}}}$$

wherein $V_{in}$ is voltage provided by the voltage source, $R_{lim}$ is resistance of the current-limiting resistor, $\eta$ is power transfer efficiency between the primary coil and the secondary coil of the power transformer, $L_P$ is inductance of the primary coil, and $R_{TLS}$ is a total line-side resistance value that is a function of resistance of the load.

11. The method of claim 1, further comprising comparing the first voltage measurement to a specified voltage level and adjusting the first frequency to reduce difference between the first voltage measurement and the specified voltage level.

12. The method of claim 1, wherein the PSE is compatible with a power over Ethernet (PoE) standard.

13. The method of claim 1, wherein the isolated side further comprises a voltage source connected to provide the electrical current to the primary coil, the method further comprising measuring voltage provided by the voltage source and using the measured voltage in combination with the first measured voltage and the first frequency in characterizing the load.

14. Power sourcing equipment (PSE) having a line side and an isolated side, the PSE comprising:
- a power transformer having (i) a primary coil on the isolated side and (ii) a secondary coil on the line side and connected to a load; and
- power supply circuitry on the isolated side adapted to:
  - (a) generate and apply a switching signal having a first frequency, to generate an electrical current through the primary coil;
  - (b) generate, on the isolated side, a first voltage measurement corresponding to a first line-side voltage across the secondary coil resulting from the electrical current provided to the primary coil; and
  - (c) characterize the load based on the first voltage measurement and the first frequency, wherein:
  - (1) the power supply circuitry comprises:
    - a pulse frequency modulator (PFM) adapted to generate the switching signal and characterize the load;
    - a voltage source;
    - a transistor connected to the primary coil, wherein
      - the transistor is adapted to be controlled by the switching signal; and
      - the primary coil and the transistor are connected between the voltage source and a reference voltage; and
    - a current-limiting resistor connected in series with the primary coil and the transistor;
  - (2) the PFM comprises:
    - a voltage-sensing module adapted to sense the first voltage measurement;
    - a transistor driver;
    - a digital pulse modulator adapted to:
      - generate the switching signal based on a first reference voltage and the first voltage measurement; and
      - provide the switching signal to the transistor driver for driving the transistor; and
    - a state controller adapted to:
      - provide the first reference voltage; and
      - control the digital pulse modulator; and
  - (3) the digital pulse modulator comprises:
    - a subtractor adapted to generate a voltage error based on the first voltage measurement and a specified voltage level; and
    - a PFM loop controller adapted to generate the switching signal and adjust the first frequency to reduce difference between the first voltage measurement and the specified voltage level.

15. The PSE of claim 14 wherein the PFM loop controller comprises:
- a high-frequency pulse generator adapted to provide, to a first input of a multiplexer, a switching signal having a specified high frequency and a specified pulse width;
- a low-frequency pulse generator adapted to provide, to a second input of the multiplexer, a switching signal having a specified low frequency and the specified pulse width; and
- a polarity detector adapted to receive the voltage error and control the multiplexer based on polarity of the voltage error so that the multiplexer provides (i) the output of the high-frequency generator if the polarity indicates that the first voltage measurement is less than the specified voltage level and (ii) the output of the low-frequency generator if the polarity indicates that the first voltage measurement is greater than the specified voltage level.

16. The PSE of claim 14 wherein the PFM loop controller comprises:
- a linear filter adapted to receive the voltage error and generate a period value based on the voltage error;
- a counter adapted to count clock cycles based on the period value and generate a rising value that is reset substantially when the rising value exceeds the period value; and
- a comparator adapted to generate the switching signal based on comparing the rising value to a pulse width value, wherein the switching signal is (i) substantially high substantially when the rising value is less than the pulse width value and (ii) substantially low substantially when the rising value is not less than the pulse width value.

17. The PSE of claim 16, wherein the counter comprises:
- a count register adapted to generate the rising value;
- a multiplexer having a first input connected to a reset value and a second input connected to the output of an adder adapted to increment the output of the count register, the multiplexer adapted to provide an output to the count register; and
- a comparator adapted to control the multiplexer based on comparing the output of the count register to the period value, wherein the multiplexer outputs (i) the reset value substantially when the output of the count register is not less than the period value and (ii) the adder output substantially when the output of the count register is less than the period value.

18. The PSE of claim 14, wherein the power supply circuitry is adapted to:
- generate a measure indicative of the resistance of the load; and
- compare the measure to one or more specified threshold values to determine whether or not the load corresponds to a valid PD connected to receive operating power from the PSE.

19. The PSE of claim 14, further comprising an auxiliary coil located on the isolated side of the power transformer, wherein the first voltage measurement is generated using the auxiliary coil.

20. The PSE of claim 14, wherein the power supply circuitry is further adapted to:
- generate the switching signal at a second frequency, different from the first frequency, to provide a different electrical current through the primary coil; and
- generate, on the isolated side, a second voltage measurement corresponding to a second line-side voltage across the secondary coil resulting from the different electrical current provided to the primary coil, wherein the load is characterized based on the first and second voltage measurements and the first and second frequencies.

21. The PSE of claim 14, wherein the power supply circuitry is further adapted to compare the first voltage measurement to a specified voltage level and adjust the first frequency to reduce difference between the first voltage measurement and the specified voltage level.

22. The PSE of claim 14, wherein the PSE is compatible with a PoE standard.

23. Apparatus for characterizing a load connected to power sourcing equipment (PSE) having a power transformer having (i) an isolated side with a primary coil and (ii) a line side with a secondary coil connected to the load, the apparatus comprising:

(a) means for generating, on the isolated side, a switching signal having a first frequency and used to generate an electrical current through the primary coil;

(b) means for generating, on the isolated side, a first voltage measurement corresponding to a first line-side voltage across the secondary coil resulting from the electrical current provided to the primary coil;

(c) means for characterizing the load based on the first voltage measurement and the first frequency;

(d) means for generating the switching signal at a second frequency, different from the first frequency, to provide a different electrical current through the primary coil; and (e) means for generating, on the isolated side, a second voltage measurement corresponding to a second line-side voltage across the secondary coil resulting from the different electrical current provided to the primary coil, wherein the load is characterized based on the first and second voltage measurements and the first and second frequencies.

24. A method for characterizing a load connected to power sourcing equipment (PSE) having a power transformer having (i) an isolated side with a primary coil and (ii) a line side with a secondary coil connected to the load, the method comprising:

(a) generating, on the isolated side, a switching signal having a first frequency and used to generate an electrical current through the primary coil;

(b) generating, on the isolated side, a first voltage measurement corresponding to a first line-side voltage across the secondary coil resulting from the electrical current provided to the primary coil; and (c) characterizing the load based on the first voltage measurement and the first frequency, wherein:

the isolated side further comprises a transistor connected in series with the primary coil and a current-limiting resistor, wherein the transistor, primary coil, and the current-limiting resistor are connected between a voltage source and a reverence voltage;

the switching signal controls the transistor to generate the electrical current thought the primary coil;

the first frequency F is substantially related to the first line-side voltage V by:

$$\sqrt{F} = \frac{V}{\frac{V_{in}}{R_{lim}} \cdot \sqrt{\eta \cdot \frac{L_P}{2} \cdot R_{TLS}}}$$

wherein $V_{in}$ is voltage provided by the voltage source, $R_{lim}$ is resistance of the current-limiting resistor, $\eta$ is power transfer efficiency between the primary coil and the secondary coil of the power transformer, $L_P$ is inductance of the primary coil, and $R_{TLS}$ is a total line-side resistance value that is a function of resistance of the load.

25. The method of claim 24, wherein the total line-side resistance value $R_{TLS}$ is substantially related to resistance $R_{load}$ of the load by:

$$R_{TLS} = \frac{R_{load} \cdot R_{ll}}{R_{load} + R_{ll}}$$

wherein $R_{ll}$ is total resistance of one or more resistors connected in parallel to the load.

* * * * *